Figure 3:
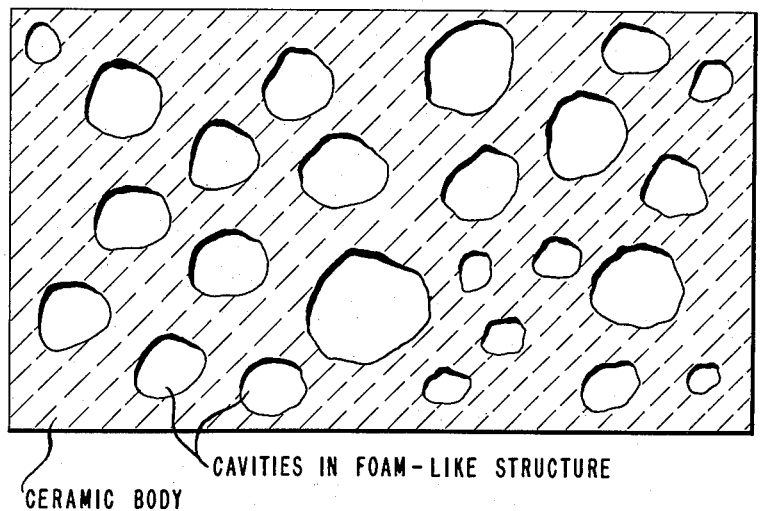

June 26, 1962 R. K. ILER 3,041,205
COMPOSITION COMPRISING COLLOIDAL SILICA AND A WATER-SOLUBLE
PHOSPHORUS COMPOUND AND ARTICLES PREPARED THEREFROM
AND PROCESS OF PREPARING SUCH ARTICLES
Filed April 1, 1959 2 Sheets-Sheet 1

*Fig. 1*

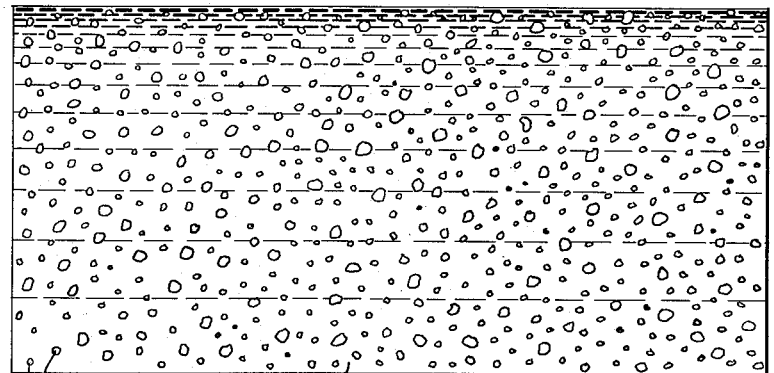

AQUEOUS SOLUTION OF $P_2O_5$ PRECURSOR
PARTICLES OF COLLOIDAL SILICA

*Fig. 2*

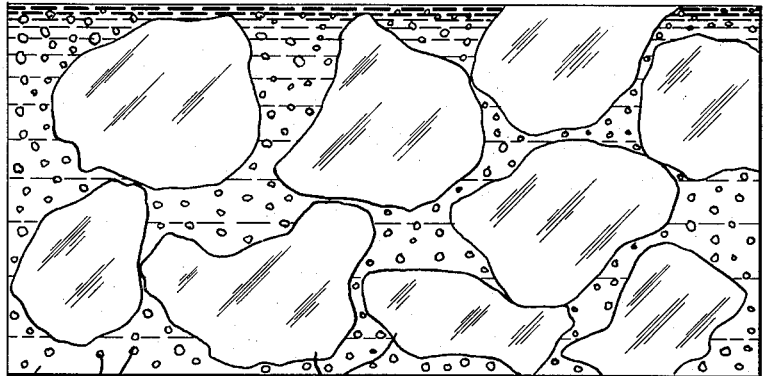

PARTICLES OF AMORPHOUS SILICA
PARTICLES OF COLLOIDAL SILICA
AQUEOUS SOLUTION OF $P_2O_5$ PRECURSOR

INVENTOR
RALPH K. ILER
BY Fred C. Carlson
ATTORNEY

June 26, 1962 R. K. ILER 3,041,205
COMPOSITION COMPRISING COLLOIDAL SILICA AND A WATER-SOLUBLE
PHOSPHORUS COMPOUND AND ARTICLES PREPARED THEREFROM
AND PROCESS OF PREPARING SUCH ARTICLES
Filed April 1, 1959 2 Sheets-Sheet 2

CAVITIES IN FOAM-LIKE STRUCTURE
CERAMIC BODY

SILICA - $P_2O_5$ GLASS
PARTICLES OF REFRACTORY OXIDE

INVENTOR
RALPH K. ILER

BY Fred C. Carlson

ATTORNEY

United States Patent Office 3,041,205
Patented June 26, 1962

3,041,205
COMPOSITION COMPRISING COLLOIDAL SILICA AND A WATER-SOLUBLE PHOSPHORUS COMPOUND AND ARTICLES PREPARED THEREFROM AND PROCESS OF PREPARING SUCH ARTICLES
Ralph K. Iler, Brandywine Hundred, Del., assignor to E. I. du Pont de Nemours and Company, Wilmington, Del., a corporation of Delaware
Filed Apr. 1, 1959, Ser. No. 803,545
13 Claims. (Cl. 117—129)

This invention relates to aqueous binder compositions comprising colloidal silica and a water-soluble phosphorus compound which yields an amorphous material containing at least about 80% $P_2O_5$ upon being heated in air at 500° C., to aqueous, mortar-like compositions comprising said binder compositions admixed with finely divided refractory oxides, to processes utilizing such binder and mortar-like compositions in thermal reactions, and to products and articles produced by the processes.

Figure 4:
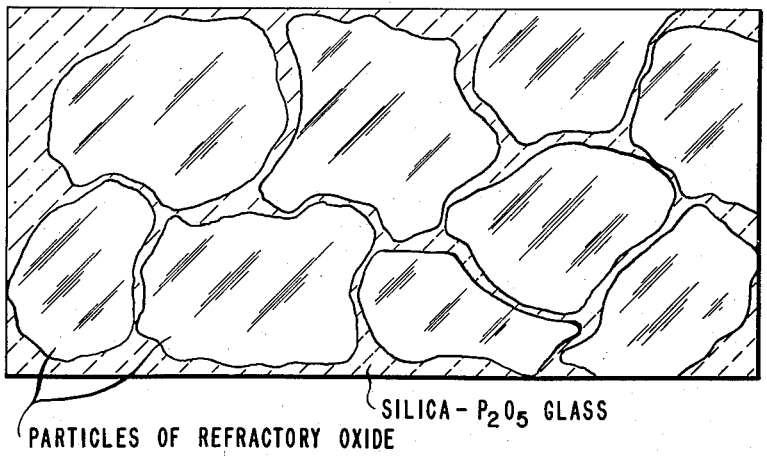

In the drawings, which are not to scale,

FIGURE 1 is a fanciful representation of a binder composition of the invention showing, in cross section, solid, colloidal particles of silica dispersed in a continuous phase comprising an aqueous solution of $P_2O_5$ precursor, and FIGURE 2 is a similar representation of a mortar-like composition of the invention comprising the binder of FIGURE 1 having dispersed therein a second solid phase of larger-than-colloidal particles of a refractory oxide, viz. amorphous silica, and FIGURE 3 is a cross-sectional representation of a porous, foam-like ceramic body produced according to a process of the invention by heating the mortar-like composition at temperatures up to about 400° C., and FIGURE 4 is a cross-sectional representation of a dense ceramic body of the invention, showing larger-than-colloidal particles of refractory oxide embedded in a matrix of an amorphous glass of the type produced by fusing silica with $P_2O_5$ in a ratio of about 1:1 according to a process of the invention.

THE AQUEOUS BINDER COMPOSITIONS

In one aspect, the present invention is concerned with aqueous binder compositions comprising (1) colloidal silica, (2) a water-soluble phosphorus compound which yields an amorphous material containing at least about 80%, preferably at least 84%, by weight of $P_2O_5$ upon being heated in air at 500° C. for two hours, the colloidal silica (calculated as $SiO_2$) and the phosphorus compound (calculated as $P_2O_5$) being present in a weight ratio within the range from 1:10 to 50:1, a range of 1:10 to 10:1 being preferred, and (3) water, the total concentration of the colloidal silica and the phosphorus compound in the aqueous composition being in the range from 15% to 80% by weight. Particularly advantageous results are obtained when the $SiO_2:P_2O_5$ weight ratio is between the limits 1:2.4 to 3:1. A more preferred ratio is 2:3 to 3:1, and uniquely beneficial results are obtained when the ratio is about 2:1.

The concentration of colloidal silica in the aqueous binder solution produced is at least 10%, and preferably greater than 25%, by weight.

Colloidal silica, a term sometimes used interchangeably with "silica sol," is used herein in its conventionally accepted meaning, i.e., particulate silica in which the particles are of such a size that they exhibit colloidal behavior. This particle size is usually from about 2 to 150 millimicrons average particle diameter, although particles having average diameter size somewhat greater than this general range is considered within the scope of this invention.

The colloidal character of the silica component of the binder composition is important. Even very finely ground amorphous silica powder is not sufficiently subdivided to resist settling out. Moreover, colloidal silica reacts mode readily with the $P_2O_5$ component at relatively low temperatures than does finely ground silica.

Colloidal silica of the type preferred for use in this invention can be prepared by the process described in Bechtold and Snyder U.S. Patent 2,574,902. Other suitable processes for making colloidal silica are described in "The Colloid Chemistry of Silica and Silicates" by Ralph K. Iler (Cornell Press). The burning of ethyl silicate has been found to be a satisfactory way for making the colloidally subdivided silica if the concentration of $SiO_2$ in the binder composition is to be less than 25%.

The phosphorus-containing compound used in making the aqueous binder composition can be selected from a large class of suitable materials. For instance, phosphoric, polyphosphoric, pyrophosphoric, or amidophosphoric acid can be employed, or salts of such acids, providing the base of the salts is decomposable and volatilizable to leave a glassy solid rich in $P_2O_5$ at elevated temperatures. The phosphorus compounds which thus decompose upon heating above about 500° C. are hereinafter sometimes referred to as "$P_2O_5$ precursors."

It will be understood that in referring to the $P_2O_5$ content, the specific compound phosphorus pentoxide, is not necessarily present as such but is in combined form such as metaphosphoric or polymetaphosphoric acid. However, as is conventional in expressing the composition of phosphorus compounds, the phosphorus content is expressed as equivalent $P_2O_5$.

Preferred phosphorus-containing compounds include volatile base compounds, such as ammonium polyphosphate, ammonia polyphosphamic acid, and "Victamide," a commercial product sold by Victor Chemical Company and made from $P_2O_5$ and $NH_3$.

Ammonium polyphosphate can, for example, be made by neutralizing syrupy polyphosphoric acid (116% equivalent $H_3PO_4$) by running the acid slowly into concentrated ammonia at 0° C. with mild agitation. Sufficient ammonia must be employed so that an excess will remain at the end of the reaction. The solution can be concentrated if necessary to 30% or 40% by weight of $P_2O_5$ equivalent.

The "Victamide" phosphorus compound is described in U.S. Patent No. 2,122,122 as a neutral product of the reaction of $P_2O_5$ and anhydrous ammonia at 150° C., having a N/P atomic ratio less than 1.5/1 containing no water of constitution. This material dissolves slowly in warm water to give very concentrated, slightly viscous solutions. "Victamide" contains about 70% to 76% by weight of $P_2O_5$.

A concentrated solution of ammonium polymetaphosphate can be employed. It can be prepared by dissolving Kurrol's salts, potassium polymetaphosphate, in water by ion exchanging the potassium with ammonium ion by means of an ion-exchange resin, and thereby obtaining a viscous solution of ammonium polymetaphosphate. By cautious hydrolysis of this solution by heating at 100° C. with sufficient addition of ammonia to maintain a pH around 8 or 9, it is possible to prepare syrupy solutions containing 40% or 50% of low molecular weight ammonium polyphosphates.

Other ammonium salts of phosphorus-derived acids such as phosphamic acid, can be employed by working with warm solutions, but the use of materials which can crystallize from solution at ordinary temperatures is less preferred.

Syrupy phosphoric acids dissolved in water can be employed, but give less satisfactory results in the use of the binder composition except when it is employed to solubilize certain metal oxides in the binder composition.

Volatile weak bases other than ammonia, such as organic amines can also be employed, although bad odors upon drying and firing of materials are sometimes objectionable. A number of organic bases such as triphenylsulfonium hydroxide, tetramethylammonium hydroxide, guanidine, piperidine, and other organic bases can be employed for the preparation of salts of phosphoric acid precursor compounds for this invention, but ammonia base materials appear to be the most practical and are therefore preferred.

The $P_2O_5$ precursor compound should be highly soluble in water, since it is necessary to produce aqueous dispersions containing more than 25% $P_2O_5$ equivalent. The preferred compounds are those which are soluble to at least the extent of dissolving in their own weight of water. They should preferably be stable for reasonably long periods of time, such as at least several days, at room temperature in water, although less stable compositions are satisfactory if promptly used.

As further examples illustrating the wide range of phosphorus containing compounds which can be used in the novel binder composition of this invention, there can be mentioned neutral water-soluble compounds of phosphorus, such as triethylphosphate, which can be used as an equivalent of ammonium polymetaphosphate if hydrolyzed by ammonia. For example, a colloidal solution of silica in triethyl-phosphate can be prepared, and by thermal decomposition or by heating with sufficient water, triethylphosphate can be hydrolyzed to liberate phosphoric acid.

Another useful compound is ammonium acid phosphite, $NH_4H_2PO_3$, which melts to a liquid at 123° C. and which decomposes at 150° C.

The components of the aqueous binder can be admixed under any suitable conditions which effect a degree of dispersion of the colloidal silica and phosphorus compound in the water adequate to give a fluid composition. The aqueous binder thus can be a relatively concentrated dispersion or solution of colloidal silica and a water-soluble phosphorus pentoxide precursor in water.

The choice of the particular constituents and proportions thereof to use in the binders will be influenced, within the limits already stated, by the nature of the products it is desired to produce from the binders. If a very high melting point or softening point is desired in the final fired product, the $P_2O_5$ content of the final product should be relatively low, say less than about 15% $P_2O_5$, and in this case it is particularly desirable to keep the weight ratio of colloidal $SiO_2$ to $P_2O_5$ considerably greater than 1:1—as high as, for example, 10:1. On the other hand, if a fine, even foam structure is desired for good insulating properties, a high proportion of $P_2O_5$ will be advantageous in the final product; therefore, $SiO_2:P_2O_5$ weight ratios of from 1:1 to even as low as 1:10 are selected.

Binder compositions which are relatively low in colloidal silica content produce relatively water-sensitive ceramic structures unless the ceramics are heated to relatively high temperatures—i.e., of the order of 1000° C. or higher. Because the ceramics made from high $P_2O_5$-content binder compositions are relatively water sensitive, binders with ratios of from 2:3 to 10:1 are preferred. An optimum combination of high concentration of total colloidal $SiO_2$ and $P_2O_5$ in the binder solution, together with stability of the solution towards solidification, is realized with a weight ratio of $SiO_2:P_2O_5$ in the range of 2:1 to 1:2.

The nature of the silica particles in the silica sol have an important effect upon the properties of the binder. The particles must be discrete at least to the extent that they have not gelled. Preferably the silica particles are not aggregated at all, because at a given concentration aggregation of the particles causes the sol to have a higher viscosity than when the particles are not aggregated.

Advantageously, the size of the colloidal silica particles in the binder can be relatively large, i.e., in the range from 50 to 150 millimicrons in diameter. Smaller particles, even as small as 5 or 10 millimicrons in diameter, can be used, providing the binder is made up without the application of heat and used almost immediately. Some extra care must be employed in mixing such sols with the phosphorus-containing component.

The 5 to 10 millimicron particle sols tend to gel in the presence of electrolytes, and ammonium polyphosphate, for example, brings about such gelling. If the colloidal silica concentration in the binder is higher than 10 or 15% by weight, and if the colloidal silica particles are only 10 millimicrons or so in diameter, the mixtures are quite unstable in the presence of corresponding quantities of ammonium polyphosphate. However, if such compositions are made acidic with a little phosphoric acid and admixed at around 0° C. with rapid stirring, and then employed promptly in making up the mortar-like composition, the smaller particle size binder compositions have definite utility.

Silica sols of particles 15 to 20 millimicrons in diameter are somewhat more practical than sols of the smaller-sized particles just referred to. It is possible to make up binder compositions containing 20% to 30% of colloidal silica in the form of particles 15 to 20 millimicrons in diameter in combination with the phosphate component of the binder, but here also the composition must be used promptly.

For a given concentration of colloidal silica in the binder composition, stability toward gelling increases with an increase in size of the particles of colloidal silica. With colloidal silica particles from 50 to 150 millimicrons in diameter, the binder solution is sufficiently stable that immediate use is not essential. Such binder compositions can contain from 25% to as high as 40% or more of colloidal silica and an equal weight of $P_2O_5$ precursor.

The stability of this binder liquid depends to some extent on the type of $P_2O_5$ precursor employed. For example, diammonium hydrogen phosphate can be used as the precursor to the extent of its solubility in water. It is quite soluble at 15° C., 131 parts by weight dissolving in 100 parts of cold water. On the other hand, monoammonium dihydrogen phosphate is much less soluble in water at ordinary room temperature, but is extremely soluble at 100° C. Ammonium metaphosphate, sometimes called ammonium polymetaphosphate, is extremely soluble, 260 parts by weight dissolving in 100 parts by weight in water at 31° C. To avoid the gelling problem, it is preferred to use a $P_2O_5$ precursor which furnishes the lowest ionic concentration in the aqueous binder medium. Ammonium metaphosphate is a preferred precursor because, per gram of equivalent $P_2O_5$, it furnishes fewer ions than other ammonium phosphate salts. For the same reason, the ammonium phosphamate and the reaction product of $P_2O_5$ and ammonia known as "Victamide" (referred to above) are also preferred.

When the $P_2O_5$ percursor tends to migrate to the surface, it is possible to minimize this by adding the $P_2O_5$ precursor as a water-insoluble powder, along with the ceramic powder, to the colloidal silica, so that the colloidal silica will react with the $P_2O_5$ precursor as the mixture is dried and heated. Alternatively, the $P_2O_5$ precursor and the colloidal silica can be reacted separately at elevated temperature to form a water-insoluble $P_2O_5$-$SiO_2$ reaction product which can then be finely ground and mixed with the ceramic oxide in water, or with more colloidal silica before drying and firing.

If the water-insoluble $P_2O_5$ material is very finely ground and in a form suitably chemically reactive with water, it does not dissolve directly in water during the mixing of the batch, but when the batch is heated at elevated temperature, the steam and moisture react to some extent with the $P_2O_5$, bringing some of it into solution, thereby obtaining some distribution without major migration to the surface.

By the use of a $P_2O_5$ precursor which is insoluble in cold water but dissolves when the mixture is heated, the water containing colloidal silica may be considered equivalent to the binder of this invention. For example, "Victamide" is not immediately soluble in cold water. In fact, initially, it appears to be insoluble. Likewise, certain crystalline forms of ammonium polymetaphosphate are insoluble in cold water. These materials may be very finely ground and mixed with the ceramic oxide binder and then colloidal silica added to make the mortar-like compositions.

It is possible also to go further and add a temporarily water-insoluble material like pulverized ammonium polymetaphosphate, along with a colloidally subdivided silica powder, such as that obtained by burning silicon tetrachloride with a hydrocarbon gas in air. This temporarily insoluble $P_2O_5$ precursor and the colloidal amorphous silica powder may be mixed with the ceramic oxide powder, thus having in dry form all of the components of this invention, to which water can then be added. However, it will be noted that when the mixture is heated, a sufficient amount of the $P_2O_5$ passes into solution, or otherwise reacts with water and then with the colloidal silica, forming the final products of this invention.

It is not preferred to use such mixtures because, in general, they require more water and the mortar-like compositions shrink and tend to crack on drying. Nevertheless, the combination of a $P_2O_5$ precursor with colloidal silica, even in dry powder form, while not equivalent to the binder of this invention, may, when combined with ceramic oxides, yield final ceramic bodies which, after firing, are equivalent to some of the less preferred compositions of the present invention.

If amorphous silica particles larger than 150 millimicrons in average diameter are incorporated into the binder composition, they tend to settle out and the binder becomes inhomogeneous in storage and must be periodically stirred or thoroughly mixed after long standing. Dense, non-porous particles of amorphous silica in the range between 150 millimicrons and about one micron are difficult to produce. However, by separating from the finely pulverized amorphous silica powder obtained by grinding silica glass a fraction of extremely fine material (for example, by elutriation) and using it in the binder mixture, amorphous silica particles smaller than one micron and approaching the colloidal range can be introduced. These particles must be considered as part of the colloidal component of the binder mixture, since during use they perform the same function as the colloidal silica particles.

The novel aqueous binder compositions of this invention are really inorganic thermo-setting adhesives, outstanding uses for which are found in the ceramic field, as well as in other fields. Thus, the binders can be employed to bond various refractory oxides, such as zirconia, alumina titania, and rare earth oxides, as well as other refractory materials such as silicon carbide and boron carbide.

The binder compositions have utility comparable to that of sodium silicate, with the advantage that the novel binders produce a higher melting material than that bonded with sodium silicate glass. The chemical bond in a highly siliceous ceramic structure made with a binder of this invention is unique in that, as it is further heated, $P_2O_5$ evaporates leaving $SiO_2$, a higher melting material. Thus, the bond continually improves its own strength at higher temperatures as part of the composition evaporates. This is not true of a sodium silicate glass bond.

The binder compositions are useful in the bonding of abrasive particles, such as silicon carbide granules. The fired compositions are extremely hard and strong, and in fact the fusion products obtained from the binder solution are sufficiently hard to scratch glass. Specific uses depend upon the relative coefficients of thermal expansion of the components in admixture.

The aqueous binder compositions of this invention provide an inorganic adhesive which sets at 100° C. or slightly higher, and at elevated temperatures forms a water-insoluble bond. Structures made from the novel composition, held together by hard and strong bonding material, exhibit high melting points. Even at the melting point, the materials soften gradually rather than being instantaneously converted to a fluid state. The compositions furthermore can be molded and set, or otherwise shaped and formed, at relatively low temperatures. They thus are suitable for application to ceramic surfaces, for being coated onto metals, and for being shaped by molding, or extrusion into sheets, rods or other shapes.

THE AQUEOUS MORTAR-LIKE COMPOSITIONS

A further aspect of this invention is concerned with aqueous, mortar-like compositions comprising the aqueous binder compositions described above, admixed with finely divided larger-than-colloidal particles of a water-insoluble refractory metal oxide, the weight ratio of the colloidal silica in the binder plus the refractory metal oxide to the $P_2O_5$ in the binder being within the range from 75:25 to 99:1.

By "refractory metal oxide" is meant a metal oxide which is difficult to fuse. This class includes oxides having a free energy of formation at 1000° C. of more than 60 kilocalories per gram atom of oxygen in the oxide. A typical group of suitable oxides, and their free energies of formation is shown in the following table:

| Oxide: | $\Delta F$ at 1000° C. |
|---|---|
| $Y_2O_3$ | 125 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| $ZrSiO_4$ | 95 |
| TiO | 95 |
| $TiO_2$ | 85 |
| $SiO_2$ | 78 |
| $Ta_2O_5$ | 75 |
| $V_2O_3$ | 74 |
| $NbO_2$ | 70 |
| $Cr_2O_3$ | 62 |

By "water-insoluble" is meant that the oxide does not react with, or dissolve in, water to an extent greater than 0.2% by weight. Thus, calcium oxide and barium oxide, for instance, are excluded even though they are refractory.

It will be understood that mixed oxides are included, provided they meet the above-indicated requirements. Thus, magnesium silicate, $MgSiO_3$, is a mixed oxide of MgO and $SiO_2$ and is water-insoluble and refractory, hence included.

Amorphous silica is an insoluble refractory oxide typical of those which can be used in the novel mortar-like compositions. The invention is hereinafter described with particular reference to it, but what is said with regard to it is also applicable to other refractory oxides unless otherwise indicated.

The amorphous silica particles used in the mortar-like compositions of this invention include finely divided globular particles in the form of a powder, as well as fibrous particles. It is usually preferred to have all of the amorphous silica powder in the finely divided state, but for some purposes, coarser amorphous silica can be included in the composition, especially where lower porosity in the ultimate fired product is desired. Stronger ceramic bodies are obtained by blending coarse and fine powders of amorphous silica so as to obtain optimum packing of the amorphous silica particles, leaving less space to be filled by the binder.

Finely divided amorphous silica can be obtained by ball milling or otherwise grinding fused silica glass to the desired particle size. Sand can be fused in an electric furnace to vitreous silica, which is then cooled and pulverized. A commercial, finely divided amorphous silica product known as "Northite," available from the North Foundry Company, Atlanta, Georgia, has been found to be very satisfactory. The amorphous silica powder is preferably sufficiently fine to pass a screen of 100 mesh per inch.

In order to create, upon heating, the strongest bond between the particles of finely divided amorphous silica, it is necessary to furnish in the mortar-like composition sufficient binder as colloidal silica and $P_2O_5$ to fill a substantial portion of the space between the amorphous silica particles. Thus, in the final composition, from about 50% to 80% of the solid body, by volume, is furnished by the amorphous silica, with the remaining part of the body being primarily the reaction products of colloidal silica and $P_2O_5$.

As already stated, the novel mortar-like compositions of this invention can contain $SiO_2$ to $P_2O_5$ in a weight ratio within the range of 75:25 to 99:1. The solid ceramic products obtained by firing compositions containing as much as 25% $P_2O_5$ exhibit considerably lower melting temperatures and have poorer thermal shock resistance; however, such ceramic structures can be made in a relatively light, coarser foamed structure having good insulation resistance, which are particularly advantageous in use at 1000° C. or less. Although compositions containing as little as 1% $P_2O_5$ are relatively difficult to produce in the foamed state, the fired product is more resistant to melting at high temperatures and exhibits excellent thermal shock resistance.

It has been noted that the $P_2O_5$ content in particular affects the high-temperature stability of highly siliceous ceramic bodies made from the mortars. When small amounts of $P_2O_5$ are present, for example, less than about 5% by weight, the $P_2O_5$ exhibits an accelerating effect on the conversion of amorphous silica to alpha-cristobalite at an elevated temperature such as 1300° C. This conversion to alpha-cristobalite does not necessarily weaken the body, since the alpha-cristobalite forms in a matrix of amorphous silica. Concurrently, however, there is some lowering of the resistance of the body to thermal shock, due to the higher coefficient of thermal expansion of the alpha-cristobalite.

On the other hand, larger quantities of $P_2O_5$, for example on the order of about 10% by weight, in the amorphous silica mortar-like compositon retard conversion of amorphous silica to the crystalline state. Thus, for such compositions treated to about 1300° C., the resultant ceramic body retains its property of thermal shock resistance for a longer period of time at high temperatures. Even after being heated for some time at elevated temperatures, the ceramic body does not crack when suddenly quenched in cold water. Concentrations of $P_2O_5$ greater than about 15% by weight retard formation of crystalline silica to an even greater extent than do smaller amounts, but this is accomplished with some sacrifice of strength during use at elevated temperatures. Generally speaking, the more $P_2O_5$ in the composition, the lower the temperature at which the ceramic body softens.

It should be noted that with highly siliceous bodies a $P_2O_5$ content as low as about 1% is definitely advantageous from the standpoint of developing strength at temperatures as low as 1000° C. In the range of $P_2O_5$ concentration below 5% devitrification is accelerated at higher temperatures yet for bodies to be employed only at around 1000° C., this small quantity of $P_2O_5$ enables the development of greater structural strength in the ceramic body.

As with the binder compositions, the amount of each ingredient in the aqueous mortar-like compositions of this invention will, within the specified critical limits, depend upon the properties desired in the final product. The amount and nature of amorphous silica or other refractory oxide used in the mortar-like composition will also affect the amounts of the components of the binder composition.

For use at high temperatures, such as above 1000° C., a preferred mortar-like composition of this invention has as its principal constituent, by volume, amorphous silica powder for at least two reasons: (1) The use of the amorphous silica powder with the colloidal silica in the composition provides a binary system which has a higher melting point than ordinarily obtained when using ternary systems. (2) The thermal coefficient of expansion of amorphous silica is very low and, therefore, ceramic products made primarily from amorphous silica have superior resistance to thermal shock.

As shown below in the examples, fibrous silica glass can be bonded with the compositions of this invention in place of the amorphous silica or other refractory oxide powder. Ceramic bodies having a bulk density of less than one gram per cc. have been obtained by this means.

A significantly lesser amount by weight of colloidal silica can be employed in the binder solution if, present with the amorphous silica or other refractory oxide to be admixed with the binder in making the mortar-like composition, there is an equivalent of colloidal silica, for example, very finely divided silica gel or a silica powder of the type used for rubber filler. In other words, the spirit of this invention encompasses admixing with the mortar-like composition a highly reactive silica powder to make up for any deficiency of colloidal silica in the binder composition.

The novel mortar compositions of this invention have many utilities. They can be used as a ceramic mass from which to make refractory materials, e.g., erosion-resistant fire bricks, for exposure to high-temperature flames. The mortars can be applied as a coating to metals which are to be subjected to elevated temperatures. Anchoring of the mortar paste to metal base can be accomplished by means of graded ceramic seals of varying coefficients of expansion, or by anchoring the ceramic body to the metal substrate by metallic or equivalent inserts of screens anchored to the underlying metal. The novel compositions are useful also as mortar for cementing together such materials of construction as tiles, steel, brick, metal rods, sheets and screens.

COMPOSITION CONTAINING WATER-INSOLUBLE METAL PHOSPHATES

In a preferred aspect of this invention when the $P_2O_5$ precursor is phosphoric acid, there can be present in the novel compositions, in place of or in addition to the refractory metal oxide particles above mentioned, polyvalent metal phosphates which are normally insoluble in water, but which can be obtained in solution in aqueous phosphoric acid solutions. This aspect will be described hereinafter with especial reference to certain aluminum phosphates, but it will be understood that any polyvalent-metal phosphate which is substantially insoluble in water, but which is soluble when formed by dissolution of the metal hydroxide in excess phosphoric acid, may be used. This group includes, for instance, $AlPO_4$ in solution in an equimolar amount of $H_3PO_4$ in aqueous solution and $Mg_3(PO_4)_2$ in solution in twice its molar equivalent of $H_3PO_4$ in concentrated aqueous solution.

It will be understood that in this aspect of the invention, as with other aspects also, the presence of water-soluble phosphate compounds of non-volatile monovalent bases such as those of alkali metal bases, is objectionable and to be avoided. This is for the reasons that alkali-metal base phosphates, such as sodium phosphate, lower the fusion points of the ultimate products, increase their sensitivity to water, and cause yellowing upon aging.

Thus, the only $P_2O_5$-containing, water-soluble compounds permitted to be present are $P_2O_5$ precursors as already defined and ordinarily the only $P_2O_5$ precursor present will be phosphoric acid. The phosphates which it is here disclosed to add are water-insoluble, being salts of polyvalent metals.

Typical of the polyvalent metal phosphates which are suitable is the aluminum phosphate which is commercially available under the trade name "Alkophos C" of the Monsanto Chemical Co. This is a highly soluble material, forming a 50% by weight aqueous phosphoric acid solution which for purposes of this discussion can be considered to be a solution of $AlPO_4$. In other words, the solution formed from "Alkophos C" is phosphoric acid in which a sufficient amount of alumina has been dissolved to give an $Al/PO_4$ mol ratio of 0.5:1. Since aluminum phosphate has the empirical formula $AlPO_4$ the solution can be considered to contain an equimolar mixture of $AlPO_4$ and $H_3PO_4$. In effect, it is $AlPO_4$ dissolved in aqueous phosphoric acid.

Although the aluminum phosphate or other polyvalent metal phosphate is soluble in aqueous phosphoric acid solutions, it is not "water-soluble" in the sense in which that term is used in describing this invention. In other words, a phosphate which is soluble only to the extent of 0.1% by weight in water alone is considered to be water-insoluble, regardless of how much the solubility is increased by adding phosphoric acid to the water.

It will be evident that when the $P_2O_5$ precursor is phosphoric acid and the refractory metal oxide referred to above under the heading "The Aqueous Mortar-Like Compositions" is soluble in phosphoric acid (as is the case with alumina or magnesia, for instance), the corresponding metal phosphate will be formed in situ in the aqueous binder. This alternative means of effecting the presence of the metal phosphate is considered to be an aspect of the invention which is within the scope of the appended claims.

It is to be understood that any phosphoric acid-dissolved metal phosphates present according to this aspect of the invention are not part of the $P_2O_5$ precursor because they are not salts of volatile bases. They are not to be included in the $P_2O_5$ component as expressed in the claims since, without the phosphoric acid present, they are not water-soluble. Moreover, if the metal salts are formed in situ by dissolution of part of the metal oxide, an appropriate subtraction will be made in calculating the proportions of $P_2O_5$ precursor and metal oxide present.

Thus, for instance, in the case where a water-insoluble refractory oxide is dissolved in a phosphoric acid precursor, the residue after heating at 500° C. may not contain as much as 80% $P_2O_5$. However, in this case one should correct for the amount of $P_2O_5$ corresponding to the orthophosphate of the refractory oxide employed. After making this correction, the residue, excluding the orthophosphate, should still contain at least about 80% $P_2O_5$. Specifically, if one uses an aqueous solution of phosphoric acid in which some $Al_2O_3$ has been dissolved, then in calculating the composition of the product obtained after heating the composition at 500° C. for two hours, one must correct for the $AlPO_4$ content.

To illustrate the above, if one heats an equimolar mixture of $AlPO_4$ and phosphoric acid and obtains 100 grams of a residue containing 25% by weight of $Al_2O_3$ and 70% $P_2O_5$ by analysis, then 25 grams of $Al_2O_3$ is combined with $P_2O_5$ as 59.5 grams of $AlPO_4$, the $AlPO_4$ containing 34.5 grams of bound $P_2O_5$. The other 40.5 grams of the residue contains $(70-34.5)=35.5$ grams of $P_2O_5$. Thus the residue, exlusive of $AlPO_4$, contains $$\left(\frac{35.5 \times 100}{100-59.5}\right)=87.5\% \text{ by weight of } P_2O_5$$

HEATING BINDERS AND MORTARS TO FOAMED STRUCTURES

The binder and mortar-like compositions are utilized in processes of the invention by heating the aqueous compositions at elevated temperatures for a time sufficient to impart desired properties to the products produced. While the heating temperature and rate and duration of heating is of considerable importance, the actual conditions selected by the user will depend upon the desired properties of the resultant product.

A particularly unexpected property of the aqueous binder and mortar-like compositions of this invention, containing high enough concentrations of $P_2O_5$ to make the aqueous phase viscous, resides in their characteristic that, upon being dried and heated as prescribed herein, the compositions develop a foam-like mass. This foamed mass provides unusually good thermal insulating properties, yet when heated to much higher temperatures, it resists melting and disintegration.

Upon heating the binder composition, the water component volatilizes at elevated temperatures to form bubbles and creates an internal foaming or bubbling of the liquid mixture, resulting ultimately in a foam-like porous structure in the solid state. Other volatile compounds present, as in conjunction with the phosphorus pentoxide precursor and particularly including ammonia, also volatilize upon such heating.

To develop a foam-like structure from the plastic mass containing the material which is volatilized at elevated temperatures, the rate of heating is properly controlled. If this rate is extremely slow, the volatile constituents diffuse out of the mass without creating bubbles at any point and a dense, non-foam solid is left. On the other hand, if the wet binder composition is heated very suddenly, the upper surface of the mass foams up and hardens immediately, leaving the wet underlying portions to expand later and cause a breaking up of the surface layers to produce very light-weight but weak and inhomogeneous solid structures.

In some cases, preliminary drying at 50 to 100° C. is desirable to permit some evaporation of water and partial setting of the mass. In other cases, the mixture is heated directly at temperatures of 100° C. to 400° C. or even higher to form the expanded foam structure.

Concurrently with bubble formation by vaporization of volatile constituents, the phosphorus-containing compound upon heating yields an amorphous material containing phosphorus pentoxide which forms a structurally strong, solid reaction product with the colloidal silica. This solid reaction product has properties which are dependent upon the nature and amounts of the binder composition components and the heating conditions.

Upon heating the binder and mortar-like compositions at temperatures in the range from about 100° C. to about 1400° C. or higher, the phosphorus-containing compound decomposes below about 400° C. causing bubble formation within the structure, and above 400° C. the phosphorus-containing compound changes to $P_2O_5$ or a derivative thereof, either of which is reactive with the colloidal silica to form an extremely strong structure.

Upon further heating of the highly siliceous, mortar-like compositions of this invention at high temperatures, say above 1700° C., a volatile constituent, namely phosphorus pentoxide, is evolved, thereby permitting the structure to continue to expand and foam as it approaches the softening point. In this manner, as the foam structure on the surface of the body melts and collapses, further bubbles of foam rise below the surface, compensating for the collapse of foam in the surface. This outstanding property is believed to be unique in ceramic compositions. However, when the composition contains ceramic oxides such as zirconium oxide, which react with $P_2O_5$ to give a very high-melting phosphate, $P_2O_5$ is not volatilized at the temperatures here involved, and non-foaming, very temperature-resistant bodies are produced.

The rate of heating of the mortar-like compositions of this invention will, as with the binder compositions discussed above, affect the physical properties of the fired ceramic body ultimately obtained. If heating is very slow, extending, for example, over a period of several weeks, the foam structure does not develop to any appreciable extent. On the other hand, if the wet composition is heated in a mold very suddenly, the upper surface of the mass foams up and hardens immediately, while the underlying portions are still wet. This is followed by expansion of the underlying portions to cause a breaking up of the surface layers, resulting in an extremely weak inhomogeneous ceramic solid. For each particular composition of the invention, the necessary conditions for producing any particular desired type of foam structure can be readily determined by a person skilled in the art in accordance with the foregoing disclosure.

The product obtained by heating either a binder composition or a mortar-like composition of this invention as above described exhibits a foam-like structure, characterized by containing small, more or less round, bubbles or cavities or pores. Some conventional ceramics have a porosity as high as 20% with a porosity chiefly in the form of voids between the original solid particles making up the ceramics. Such conventional ceramics, of course, become more dense the higher the firing temperature. On the other hand, the preferred foamed compositions of this invention for the most part have a porosity greater than 20%. The extra porosity is present in the form of bubbles or spherical or rounded cavities, which may range from microscopic in size up to as large as ¼ inch in diameter, depending on the ingredients and conditions of heat treatment. Since the density of amorphous silica, the major constituent, in solid form is about 140 pounds per cubic foot, this means that many of the highly siliceous products of this invention have a density of less than 112 pounds per cubic foot. Such low densities are ordinarily not obtained when very heavy ceramic oxides, such as zirconium oxide, are used.

As pointed out above, greater porosity will result from the use of a binder composition having, within the specified range, a relatively high $P_2O_5$ equivalent content, while on the other hand, better temperature resistance results from a relatively low $P_2O_5$ equivalent content. It is therefore possible to obtain a combination of the best of these properties by the use of a relatively low $P_2O_5$ content for better temperature resistance, while obtaining the desired porosity by other suitable means.

One such way for inducing porosity is to incorporate in the mortar-type composition prior to heating up to 20% by weight based on dry solids of a mixture of micronized estersil with methyl cellulose. Micronized estersil is a finely divided, low-density, hydrophobic, sponge-like siliceous powder described on pages 170–171, in "The Colloid Chemistry of Silica and Silicates," by Ralph K. Iler (Cornell Press, 1955). Upon heating the composition, gaseous cavities result. Other porosity-inducing means, such as hollow glass beads or solids which evolve gases, can of course be used.

A particularly interesting utility of the foam-like ceramic products is for the coating of ceramic bricks for lining high-temperature furnaces. Fire bricks which melt in an oxygen-gas flame, for example, can be coated with the compositions of this invention to give surfaces which have most of the refractory properties of vitreous silica. Vitreous silica has a particular advantage over other, conventional refractories at temperatures up to 1800° C. in that even at the melting point, the mass does not become fluid, but merely plastic. The highly siliceous compositions of this invention furnish $P_2O_5$ which slowly volatilizes, and thus continually foams up from beneath the surface, maintaining the insulative nature of the furnace lining.

FORMING VITREOUS STRUCTURES

By heating the admixed binder and refractory oxide, preferably amorphous silica, at temperatures above 400° C. and up to 1400° C. and higher, there is formed a residue of $P_2O_5$ equivalent which together with the colloidal $SiO_2$ forms a vitreous ceramic bond between the larger-than-colloidal amorphous silica or other refractory oxide particles.

The maximum temperature at which the compositions of this invention should be fired prior to use of the fired product, will depend upon the anticipated end use of the fired product, and in particular on the temperature at which the end product is to be used. If it is desired merely to harden the ceramic body, as in the form of a brick for use as a refractory material, for example, as furnace insulation, then baking for a period of a few minutes to one-half hour at about 400° C. will be adequate, although optimum water resistance is not achieved. Preferably, the materials are fired at about 1000° C. to complete the hardening of the mass and develop good water resistance in case the products are exposed to rain or moisture. Of course, when the compositions are used as fire brick or other high-temperature insulation material, the baking treatment during use in the furnace will improve some of the properties, such as the water-resistance, of the ceramic structure.

Many of the preferred products resulting from heating the mortar-like composition of this invention have a density ranging from 75 pounds per cubic foot to as low as 30 pounds per cubic foot or less. Dense products can be made by pressing the foamed material while it is still at a temperature less than 500° C. to collapse the bubbles and holes, and then continue firing at elevated temperatures.

A wide variety of solid materials, hereinafter referred to as adjuvants, can be admixed with either or both the binder composition or the mortar-like composition to impart particularly desirable properties. Such adjuvants, of which there may be more than one in the same composition, will preferably not exceed, on a total solids weight basis, an amount of 50% of the total composition, and preferably not more than 25%. For example, selected adjuvants can be used to impart color, to deluster, to furnish high abrasion resistance, etc. It is only required that such adjuvants be compatible with the essential components of the composition, be not corroded or attacked by them.

As illustrative but not limitative of suitable abrasion resistance imparting adjuvants, there can be mentioned, for example, particles of silicon carbide, boron carbide, titanium carbide, molybdenum silicide, zirconium boride, boron nitride, etc. Stainless steel shot can be admixed with the compositions.

The highly siliceous, fired ceramic products of this invention are vitreous. When fired at 1000° C., the products give very little indication of crystalline structure when examined by X-ray diffraction. After prolonged heating at very high temperatures some devitrification may occur, but the preferred ceramic products are essentially amorphous. If crystalline adjuvants have been combined with the composition, these materials will of course give characteristic X-ray patterns. Also, if the ceramic oxide employed is other than silica, the $P_2O_5$ may react with the ceramic oxide to form crystalline phosphates at high temperatures.

The exact chemical nature of the bond holding together the fired ceramic structure is not fully understood, but it is believed to be some sort of $SiO_2$—$P_2O_5$ bond. Since silicon phosphate is a crystalline material of well-defined composition, namely, $SiO_2:P_2O_5$, and on the other hand, the highly siliceous fired products of this invention are generally amorphous, it is believed that the products do not contain any significant amount of crystalline silicon phosphate.

THE DENSE CERAMIC BODIES

The vitreous structures just discussed can have greater or lesser density depending upon their manner of preparation. The ceramic products which after firing have a maximum density (i.e., a minimum of porosity) are an especially important embodiment of the present invention.

By confining to a minimum the $P_2O_5$ content of the binder solution used in making the ceramic bodies, products of maximum density are ultimately produced. The colloidal silica-$P_2O_5$ binder solutions which contain relatively smaller amounts of $P_2O_5$ (for example, less than 10% by weight of $P_2O_5$ in the binder) do not foam nearly so much as compositions containing larger amounts, and when the binder contains 25 or 30% silica and only 5% $P_2O_5$ it foams very little. It is the latter type of binder which, with the amorphous silica or other refractory oxide of the mortar-like composition, gives the dense ceramic structures after firing.

More particularly, the dense, ceramic bodies comprise structures wherein there is present larger-than-colloidal particles of a refractory material bonded together with a vitreous, fired $SiO_2:P_2O_5$ composition in which the $SiO_2:P_2O_5$ weight ratio is at least 0.5:1 and preferably from 1:1 to 50:1.

It is interesting to note in this connection that when the percentage of $P_2O_5$ in the original binder is low, there is more latitude as to the type of $P_2O_5$-precursor which can be used to advantage. This is particularly true if the mixture is made up with the preferred type of silica sol above described, just before use. In this case, ammonium phosphate may be employed satisfactorily, although polymeric, water-soluble phosphates such as "Victamide" have the advantage that they do not crystallize out on the surface of the ceramic body during drying.

COATING METALS WITH THE $SiO_2:P_2O_5$ COMPOSITIONS

Another important aspect of the invention relates to processes for coating metals with the dense, vitreous $SiO_2$—$P_2O_5$ compositions and to the coated articles so produced.

According to the processes, there is applied to a metal substrate a film of an aqueous $SiO_2$—$P_2O_5$ composition of the invention, with or without the amorphous silica or other refractory oxide of the mortar-like compositions. This film is then dried and fired to about 370° C. or higher, whereupon the colloidal silica and $P_2O_5$ compound reacts to give a glass-like, corrosion-resistant finish.

In greater thickness, as applied to steel, the $SiO_2:P_2O_5$ coating on the metal has the useful characteristic that when the steel is heated to red heat and mill scale develops, the $SiO_2$—$P_2O_5$ coating causes the scale to flake off cleanly, when quenched, leaving the metal free from the black scale which is ordinarily somewhat adherent and difficult to remove before pickling.

The coatings upon the metal are also water-resistant and provide high electrical resistance.

The conditions used for making the coatings are preferably those described above for making dense ceramic structures. The proportions of colloidal silica and $P_2O_5$—precursor are preferably such that the volume of $H_3PO_4$ equivalent is close to the true volume of colloidal silica solids.

EXAMPLES

The invention will be better understood by reference to the following illustrative examples.

Example 1

For the preparation of an aqueous binder composition according to this invention, a concentrated solution of ammonium polyphosphate was made as follows: 63.5 parts by weight of syrupy phosphoric acid (116% equivalent $H_3PO_4$) was added to a mixture of 100 parts by weight of finely crushed ice and 56 parts by weight of concentrated aqueous ammonium hydroxide solution (28% $NH_3$), while stirring the mixture of ice and concentrated ammonium hydroxide with a high speed agitator. Additional ice was added as the heat of reaction warmed up the mixture, until the final ammonium polyphosphate solution was obtained which contained 23.2 g. of $P_2O_5$ equivalent, per 100 cc. volume. Then 45 parts by volume of this ammonium polyphosphate solution was mixed with 14 parts by volume of an aqueous solution of colloidal silica containing 48% by weight $SiO_2$, the silica particles having an average particle diameter of 100 millimicrons. The mixture was a very milky liquid. It was then vacuum concentrated while maintaining the liquid in the evaporator below 50° C., until the turbidity disappeared and there remained a clear viscous syrup, which contained approximately 38% by weight of $SiO_2$, 41.5% by weight of $P_2O_5$ equivalent, and 20% water.

Example 2

A binder solution was prepared from pyrophosphoric acid and colloidal silica as follows: syrupy pyrophosphoric acid (116% $H_3PO_5$ equivalent) was added to sufficient water so that the resultant mixture contained 24.3 grams of $P_2O_5$ equivalent per 100 cc. volume. The addition of the acid to the water was carried out slowly with continued cooling of the mixture, to keep the temperature below 50° C. A sufficient volume of this pyrophosphoric acid solution to contain 15 parts by weight of $P_2O_5$ was mixed with 31 parts by weight of a concentrated aqueous solution of colloidal silica containing 48% by weight of $SiO_2$ in the form of particles having an average particle diameter of about 100 millimicrons and a specific surface area of 28 m.$^2$/g. Water was then removed from the mixture by vacuum distillation, maintaining a temperature below 50° C., until the concentrations of $SiO_2$ and $P_2O_6$ were each about 40% by weight. The resultant product was an opaque, white fluid.

Example 3

A binder composition was prepared from similar materials and by the same technique used in making the binder of Example 1, but the product was concentrated to a clear syrup containing 32% by weight each of $SiO_2$ and $P_2O_5$ equivalent.

Example 4

A binder composition was prepared from ammonium amidopolyphosphate of a type known commercially as "Victamide" (referred to above) containing 69.7% $P_2O_5$, by weight and from colloidal silica as follows: One hundred parts by weight of "Victamide" was mixed with 66 parts by weight of water, and the resultant pasty mass permitted to stand in a closed vessel at 50° C. for 14 hours, by which time it was converted to a clear, somewhat viscous solution. During the aging period, it was occasionally stirred to keep the mass homogeneous. Then 110 parts by weight of an aqueous 56% by weight silica sol containing colloidal silica particles averaging 100 millimicrons in diameter was added in a thin stream to the 166 parts by weight of the "Victamide" solution. The addition was carried out by adding the colloidal silica solution slowly to the "Victamide" solution with thorough agitation, so that the incoming silica sol was dispersed evenly throughout the aqueous phosphate solution as quickly and uniformly as possible. In this manner, there was obtained a homogeneous, slightly viscous, milky solution which was transparent in layers half an inch thick, containing 24 parts by weight of $SiO_2$, 29 parts by weight of $P_2O_5$ equivalent, and 47 parts by weight water. This mixture was stable after storage at ordinary temperature for several days, and was not further evaporated before use.

Example 5

A concentrated binder solution was prepared by mixing 305 parts by weight of "Victamide" (referred to above), equivalent to 231 parts by weight of $P_2O_5$, with 121 parts by weight of water, and storing the resultant mixture with occasional stirring at 50° C. until a viscous homogeneous solution was obtained, in about 24 hours.

Then 231 parts by weight of $SiO_2$, in the form of an aqueous silica sol, containing 56% by weight of $SiO_2$ in the form 100 millimicron average diameter particles, was mixed with the "Victamide" solution. The total weight of the mixture at this point was 835 parts by weight. The mixture was then subjected to vacuum distillation to remove water, concentrating the mixture until the concentrations of $SiO_2$ and $P_2O_5$ were each 37% by weight. The product was a transluscent, almost clear, slightly viscous fluid.

*Example 6*

An aqueous solution of "Victamide" (referred to above) containing 45% by weight $P_2O_5$ was prepared by placing 344 g. of "Victamide" in a container and adding 422 g. of cold water without stirring. The resultant material was then heated on boiling water for about 20 minutes, and stirring begun as soon as the composition had partly liquified. This gave a clear, slightly viscous 45% by weight $P_2O_5$ solution, 389 g. of which was mixed with 560 g. of an aqueous silica sol, containing 56.1% by weight $SiO_2$ in the form of colloidal particles averaging about 100 millimicrons in diameter, by pouring the colloidal silica into the "Victamide" solution with constant rapid agitation. The resultant milky mixture was then evaporated under vacuum, the maximum temperature being 50° C., to obtain an opalescent, somewhat translucent, viscous syrupy composition containing by weight 43.8% $SiO_2$, 24.3% $P_2O_5$, and 31.9% water.

*Example 7*

Twelve parts by weight of the binder composition of Example 1 was mixed by stirring with 10 parts by weight of finely divided amorphous silica powder, ground to pass 100 mesh, to give a viscous mortar composition.

*Example 8*

One hundred parts by weight of the fluid binder composition of Example 2 was mixed with 80 parts by weight of finely divided amorphous silica powder (passing 100 mesh) to obtain a highly viscous mortar-like paste.

*Example 9*

Twenty-two and one-half parts by weight of the binder composition of Example 3 were mixed with 22.5 parts by weight of finely divided amorphous silica powder (passing 100 mesh) to form a viscous, translucent, almost transparent paste-like mortar mass, which contained, on a solids basis, approximately 60% by weight amorphous silica, 20% by weight colloidal silica, and 20% by weight $P_2O_5$.

*Example 10*

Thirty-four and-one-half parts by weight of the binder composition of Example 4 were mixed with 81.7 parts by weight of "Northite," a finely divided amorphous silica powder (passing 100 mesh) sold by the North Foundry Company, Atlanta, Georgia, to produce an extremely dilatant mortar-like mass which would not flow except when vibrated.

*Example 11*

Twenty-seven parts by weight of the binder composition of Example 5 were thoroughly mixed with 10 parts by weight of a concentrated aqueous silica sol containing 58% by weight colloidal silica in the form of finely divided particles having an average diameter of about 100 millimicrons. The resultant mixture was then mixed with 80 parts by weight of "Northite" (referred to above) amorphous silica powder to obtain a viscous mortar-like composition which contained, on a solids basis, 75.5% by weight finely divided amorphous silica, 15.0% by weight colloidal silica, and 9.5% by weight $P_2O_5$.

*Example 12*

Forty-seven parts by weight of the binder composition of Example 5 and 80 parts by weight of 100 mesh amorphous silica powder were admixed. Because of the high viscosity and high solids content, the admixing was difficult, and the material tended to form a partially-wetted mixture rather than a fluid mass. However, by mechanically working and homogenizing the batch, a semi-fluid composition was attained. After deaeration, the material was a very smooth, viscous, mortar-like composition, easily extrudable into thin rods.

*Example 13*

One art by weight of the binder composition of Example 6 was mixed with 2 parts by weight of "Northite" (referred to above) amorphous silica powder (passing 100 mesh), by placing in a plastic bag and kneading until all the powder became wetted. There was produced a putty-like, or a taffy-like mass having a calculated content by weight, on a total solids basis, of 74.6% amorphous silica powder, 16.4% colloidal silica, and 9.0% $P_2O_5$.

*Example 14*

One part by weight of the binder composition of Example 6 was mixed with one part by weight of a concentrated aqueous silica sol containing 56.1% by weight of colloidal silica in the form of finely divided particles having an average diameter of about 100 millimicrons and four parts by weight of "Northite" (referred to above) amorphous silica powder to obtain a viscous mortar-like composition which contained, calculated by weight on a total solids basis, 76.4% amorphous silica powder, 19.0% colloidal silica, and 4.6% $P_2O_5$.

*Example 15*

One part by weight of the binder composition of Example 6 was mixed with 3 parts by weight of a concentrated aqueous colloidal silica in the form of finely divided particles having an average diameter of about 100 millimicrons and 8 parts by weight of "Northite" (referred to above) amorphous silica powder to obtain a viscous mortar-like composition which contained, calculated by weight on a total solids basis, 77.0% amorphous silica powder, 20.6% colloidal silica, and 2.4% $P_2O_5$.

*Example 16*

The mortar-like composition of Example 7 was cast into metal molds of suitable size for firebrick. The molds were filled to about 60% of their volume with the composition, and then the mixture was baked 3 hours in an oven at 120° C., during which time the mass expanded. The temperature was then raised to 300° C., for 1 hour, and finally to red heat (about 800° C.). By this procedure there was obtained a foam-like structure which was hard and strong. The bricks were removed from the mold and further fired at 1000° C. At this point, there was no collapse in the foam structure nor any change in the appearance of the bricks, but strength was improved and the ceramic was sufficiently hard that glass could easily be scratched with it.

*Example 17*

The mortar-like composition of Example 8 was deaerated under vacuum and cast into molds. It was heated to 300° C. over a period of an hour, then to 600° C. in the next hour, and cooled. It was removed from the molds and then fired for 15 minutes in a furnace at 1000° C. The ceramic bricks so produced were very spongy and extremely hard. The foam-like structure was somewhat less uniform than the ceramic product of Example 16.

*Example 18*

The composition of Example 9 was cast in the form of sheets in shallow iron molds. The material in the molds was baked for 1 hour at 200° C., during which period the mass foamed up and hardened to a porous, strong composition. At this point the material was strongly adherent to the mold. It was further heated to 500° C., removed from the mold and finally fired 2 hours at 900° C. The resultant products were 0.25 inch thick porous ceramic insulating sheets which were very resistant to melting or erosion by an oxygen-natural gas flame and exhibited remarkable insulating properties. When one face of a sheet was heated to white heat in the flame, the reverse side was barely red hot. After being heated for ½ hour at 1300° C., the foam-like vitreous sheet was unchanged in appearance and X-ray diffraction analysis of samples indicated that the body was still completely amorphous.

*Example 19*

The composition of Example 10 was jollied into molds, air dried for 18 hours, then dried at 250° F. in air for 18 hours, fired at 600° F. for 3 hours, removed from the molds, and the resulting ceramic pieces then fired for 2 hours at 1800° F. By this procedure, there were prepared porous ceramic bodies having a foam-like structure containing about 10% by weight of $P_2O_5$ and the remainder consisting of silica. The density of the foam-like ceramic product was 1.12 g. per cc., or 70 pounds per cubic foot.

*Example 20*

The composition of Example 11 was pressed into briquette molds, air dried and given the heat treatments described in Example 17. The product was a fine structured, foam-like ceramic body containing bubbles or pores up to 1 millimeter in diameter evenly distributed through the mass. The bulk density of the product was 91 pounds per cubic foot. It proved to be extremely resistant to fusion or softening in an oxygen-gas flame.

*Example 21*

The composition of Example 12 was cast in shallow iron molds, and air dried and fired under the conditions set forth in Example 19, to produce ceramic tiles 0.25 inch thick and 4 inches square. During heat treatment, the composition swelled evenly in the mold to give a very fine porous thermally shock-resistant structure, in which the largest foam bubbles were 3 millimeters in diameter, with strong ceramic walls between the bubbles throughout the extremely uniform foam structure. The density of this ceramic was 70 pounds per cubic foot.

*Example 22*

The composition of Example 13 was placed in an aluminum foil container, air dried for 12 hours at 130° F., placed for 1 hour in a 600° F. oven, then 1 hour at 800° F., and removed from the foil container since it had set quite coherently and strongly. The product was then fired from 800° F. to 1800° F., over a period of three hours to give a hard, porous structure. It was then fired from 1800° F. to 2400° F. over a period of 1.5 hours, held at 2400° F. for thirty minutes, and cooled to room temperature. The final article was a porous, vitreous, hard, strong, water-resistant, thermally shock-resistant solid ceramic body.

*Example 23*

Example 22 was repeated using the composition of Example 12. The product after firing from 800° F. to 1800° F. was hard and slightly porous, while after the final heat treatment was very hard and slightly porous.

*Example 24*

This is an example of making a ceramic body made from amorphous silica glass fiber and a binder composition according to this invention. Silica glass wool of the type employed for high temperature thermal insulation was cut up into fiber lengths of ½ to 1 inch in length, slurried in water, and cast on a suction filter to form a matt. The binder solution of Example 5 was flooded onto the fiber-glass matt and sucked through it to impregnate it. The matt was then dried in air for one week at 30° C., baked at 250° F. for 18 hours, and for 3 hours at 600° F., and 2 hours at 1800° F. A hard ceramic sheet, having a density of 47 pounds per cubic foot was produced. This sheet was very resistant to ordinary oil and gas burner flames, but softened in an oxygen-gas flame.

The above exemplary procedures can be repeated, utilizing different quantities of the same and equivalent components, within the prescribed limits. Adjuvants can of course be used as described herein.

*Example 25*

A preferred composition comprising colloidal silica and $P_2O_5$ is one in which the volume of equivalent $H_3PO_4$ is close to that of the true volume of the $SiO_2$ solids. A composition was prepared from the following ingredients: The first ingredient was a sol of colloidal silica containing colloidal amorphous silica particles having an average diameter of about 100 millimicrons, and a specific surface area of 27 m.$^2$/g. This sol contained 48% by weight of $SiO_2$, the remainder of the sol consisting of water.

The second component was a solution of the ammonium salt of polyphosphoric acid: 63.5 parts by weight of syrupy polyphosphoric acid, having an equivalent $H_3PO_4$ content of 116%, was added to 100 parts by weight of ice and 47 parts by weight of concentrated ammonium hydroxide which contained 28% by weight of $NH_3$. The polyphosphoric acid and the ice were placed in a container fitted with an agitator and the ammonium hydroxide solution was added gradually. When the temperature rose, 10 parts by weight of the ammonium hydroxide solution were further added to neutralize the acidity and additional ice was added to maintain the temperature below 49° C., so that the final composition amounted to 310 parts by weight. This solution contained the equivalent of 31.5 grams of $H_3PO_4$ per 100 ml. and had a density of 1.33 grams per ml.

A mixture of colloidal silica and the ammonium salt of polyphosphoric acid was made by mixing 1.71 volumes of the 48% silica sol (density=1.35 g./ml.) and 3.0 volumes of the foregoing ammonium polyphosphate solution. This mixture contained approximately equal volumes of $SiO_2$ solids and $P_2O_5$ solids. Thus, 1.71 mls. of sol weighed 2.31 grams and contained 1.11 grams of amorphous silica with a true volume of 0.5 ml.; also 3.0 mls. of ammonium polyphosphate solution contained 0.945 gram of $H_3PO_4$ having a volume of 0.52 ml. When a sample of this mixture was placed in a quartz dish and evaporated at 150° C., it gave a clear, glassy film. When this film was exposed to cold water, it remained coherent. When dried at 375° C., the film still appeared clear and coherent. When fired at 400° C., it became white and opaque. It was extremely adherent to the glass substrate on which it was dried. For comparison, other mixtures were prepared using, for example (*a*) 2.02 volumes of the 48% colloidal silica, and 2.4 volumes of the ammonium polyphosphate solution, (*b*) 2.38 volumes and 1.8 volumes, respectively, (*c*) 2.70 volumes and 1.2 volumes, respectively.

When these were dried, composition (*a*) containing 1.4 volumes of $SiO_2$ per volume of $H_3PO_4$, approached that of the original composition in regard to forming a coherent mass when dried. On the other hand, (*b*) and (*c*) which contained 2.2 and 3.7 volumes of $SiO_2$ per volume of $H_3PO_4$, respectively, tended to give loose powders and opaque masses when dried and fired at 500° C.

When these compositions were applied to steel in thin layers with a paint brush, air-dried, baked at 150° C., and finally fired for five minutes at 700° F., the composition containing equal volumes of $P_2O_5$ and $SiO_2$ gave the most coherent, adherent, and continuous coating. When baked at 500° C., the coated steel showed less oxidation than the rest of the uncoated steel, which developed a black, heavy scale. Aluminum metal was similarly coated and baked at 500° C., and retained an adherent coating.

When a sample of the coated steel was heated in air at

800° C. and then quenched in water, the $SiO_2$—$P_2O_5$ coating did not completely protect the metal against oxidation, but a black scale developed under the coating, and then flaked off cleanly when the sample was quenched. The steel under the coated areas which had the coating removed in this way, was bright and clean, whereas the steel which had not been coated but had been heated at 800° C. and quenched in water, was still partly covered by a black oxide layer. The $SiO_2$—$P_2O_5$ coating therefore protects steel when applied at intermediate temperatures. It also provides a way of protecting steel during heat treatment, so that after the heat treatment is completed and the steel is quenched, the surface will remain bright and clean for the application of other finishes.

*Example 26*

A sample was prepared from a 60% silica sol containing 100 millimicron particles and a 65% by weight solution of "Victamide" by slightly acidifying the silica sol and adding the "Victamide" solution with stirring, in such proportions that the final mixture contained 29% $P_2O_5$ and 21% $SiO_2$. This whitish, viscous fluid was painted on the surface of a sheet of mild steel which had been cleaned and roughened by sanding. The coating was air dried and baked at 700° F. It gave a whitish, finely formed layer, under which there was a continuous, adherent, glassy coating on the steel. The surface of the treated steel did not rust after exposure to a moist atmosphere, whereas uncoated steel, under the same conditions, was coated with a heavy layer of rust.

*Example 27*

A coating solution was made up as in the preceding example, except that the final mixture contained 20% $P_2O_5$ and 33% $SiO_2$. After baking at 700° F., there was a thin, adherent coating on the surface of the steel, which remained even after bending the steel sheet through an angle of 20°. The coating greatly retarded the rusting of the surface.

*Example 28*

A coating solution was prepared as in Example 26 but in such proportions as to give 33% $P_2O_5$ and 30% $SiO_2$. When applied to steel and baked to 700° F. in a period of one hour, the coating developed a blackish color. Upon cooling under cold water and flexing the metal, the blackish scale-like coating flaked off, leaving bright, clean metal. In this case, the coating was applied much thicker than in the examples just preceding, so that when suddenly chilled it would contract and flake off cleanly. When applied in a very thin layer, it gave a coating that was somewhat rust-preventing.

*Example 29*

Ten parts by volume of 85% phosphoric acid was added to 30 parts by volume of a silica sol containing 30% $SiO_2$ in the form of particles averaging about 15 millimicrons in diameter. Sheets of clean, mild steel were dipped into this solution, drained and dried. For comparison, similar sheets were dipped in a mixture of 10 parts by volume of 85% $H_3PO_4$ and 30 parts by volume of water and similarly drained and dried. After baking at 700° F. for 15 minutes, the coating on the steel formed from the phosphoric acid-colloidal silica mixture was dark grey in color, continuous and adherent. That formed from phosphoric acid alone was white and dusty. When samples of the coated metal were flexed, the conting containing silica was more adherent. The coating applied from the phosphoric acid-colloidal silica mixture was more rust resistant than that obtained with phosphoric acid alone.

*Example 30*

To forty parts by weight of an ammonia-stabilized colloidal silica containing 30% by weight of $SiO_2$ and having particles about 15 millimicrons in diameter, was added five parts by weight of a solution of "Victamide," the solution containing 43% by weight of $P_2O_5$. The ammonia-stabilized colloidal silica sol was first made slightly acidic by adding about 0.2 part by weight of 85% phosphoric acid and then the "Victamide" solution was added with vigorous stirring, to prevent any local gelling. This mixture remained liquid for a sufficient period of time to permit it to be mixed with the ceramic powder which in this case was "Northite" amorphous silica powder, passing 100 mesh, of which 85 parts by weight were used.

The mortar-like composition was deaerated by vibrating it under a vacuum, and then shaken into a mold, allowed to stand at room temperature for a period of three hours to permit the mixture to gel, and then dried for eighteen hours at 40° C. It was then baked for three hours at 100° C., for two further hours at 350° C., and finally removed from the mold and heated in a muffle in air to a temperature of 1000° C. over a period of two hours and held at that temperature for a further hour. There was obtained a smooth, well-cast, homogeneous ceramic body containing a calculated composition of 85.7% by weight of amorphous silica powder, 12.1% by weight of colloidal $SiO_2$, and 2.2% by weight of $P_2O_5$. Strength tests indicated that the material had a modulus of rupture of 970 p.s.i.

For comparison, a similar body was made omitting the "Victamide" and using instead, 42 parts by weight of ammonia-stabilized silica sol and 2.2 parts by weight of a 3-molar ammonium nitrate solution to promote gelling in the mold. The ceramic body obtained in this case had a modulus of rupture, measured at room temperature of only 612 p.s.i.

*Example 31*

A ceramic body containing a still higher percentage of $P_2O_5$ was made by a procedure similar to that used for Example 30, except that 36.5 parts by weight of the 30% ammonia-stabilized colloidal silica sol was employed, along with 10 parts by weight of the "Victamide" solution containing 43% $P_2O_5$, in admixture with 85 parts by weight of "Northite." In this case, the $P_2O_5$ content was 4.3%, or approximately double that of the product of Example 30. The modulus of rupture on the finished product, measured at room temperature, was 2200 p.s.i.

*Example 32*

This is an example of an $SiO_2$—$P_2O_5$ ceramic body high in $P_2O_5$ and having good strength in spite of a certain degree of porosity. The ceramic was made under the same conditions as employed for Example 30, except that there were used 8.5 parts by weight of ammonia-stabilized colloidal silica containing 30% $SiO_2$, 39.4 parts by weight of "Victamide" solution containing 43% $P_2O_5$, and 85 parts by weight of "Northite" powder. In this case, the mixture gelled extremely slowly in the mold and was still somewhat soft even after standing for 24 hours at room temperature. It was dried for another twenty-four hours at 40° C., and then baked and finally fired under the same conditions as the ceramic products of Examples 30 and 31. The final ceramic body had a calculated composition of 81.3% by weight of amorphous silica powder, 2.5% by weight of colloidal $SiO_2$, and 16.2% by weight of $P_2O_5$, and the modulus of rupture was 3010 p.s.i. at room temperature. However, the body was not fine and dense, but contained numerous small pores or bubbles, which formed when the body was dried at 100° C. Since it is obvious that these holes and pores must have considerably reduced the strength below that which the body would otherwise have had, the body was surprisingly strong.

*Example 33*

This is an example of a ceramic body made from colloidal silica and $P_2O_5$, containing no added ceramic oxide of larger particle size.

Appropriate quantities of a deionized sol of colloidal silica containing 100 millimicron particles, and an aqueous solution of "Victamide" were mixed to give an $SiO_2:P_2O_5$ weight ratio of 9:1. The mixture contained about 40% by weight of total $SiO_2$ plus $P_2O_5$ solids. This mixture was frozen with continuous stirring, and the bulk of the water removed by freeze-drying to provide a soft powder, which was then heated for three hours at 300° C. and one hour at 1000° C., to eliminate nitrogenous material and bring about a preliminary reaction between the $P_2O_5$ and the colloidal silica, so that the $P_2O_5$ was essentially in a form initially insoluble when placed in cold water.

This fine powder was mixed with 10% by weight of a lubricant, viz. a polyethylene oxide product known as "Carbowax," the mixture moistened with water to distribute the lubricant over the powder, and redried and micropulverized. This powder was then dry pressed into a mold at pressure of 2000 p.s.i. The cold-molded body was heated slowly to 500° C. in air over a period of twelve hours to burn out the organic matter without reducing the $P_2O_5$, and fired for twenty-four hours at 1200° C.

There was obtained a vitreous body containing 90% $SiO_2$ and 10% $P_2O_5$, having a bulk density of about 2.2 grams per cubic centimeter, a porosity of 0.1%, and a refractive index of 1.47, measured by the yellow line of sodium. The $P_2O_5$ was essentially insoluble and non-reactive with water, since after boiling for six hours, less than 0.3% by weight was lost from the sample. The modulus of rupture, measured at room temperature was 5100 p.s.i. and at 900° C. was 9000 p.s.i.

This ceramic body was then heated for one week at 1200° C., removed directly from the furnace while white hot and plunged into cold water, and then the strength again tested. The modulus of rupture measured at room temperature was still 5000 p.s.i., after this thermal-shock treatment.

*Example 34*

The following is an example of a ceramic body consisting largely of aluminum oxide, bonded by the binder composition of this invention.

One hundred twenty parts by weight of a very finely divided, anhydrous alumina powder known as "Alcoa A-14" obtained from the Aluminum Company of America, ground to sufficient fineness to pass a screen of 325 meshes per inch, was mixed with a binder composition prepared as follows: 36 parts by weight of a sodium-stabilized colloidal silica containing 30% $SiO_2$ in the form of 15 millimicron particles, and 0.105% $Na_2O$ as the stabilizer, was mixed with 4.9 parts by weight of an ammonium phosphate gelling agent, made by dissolving 80 grams of ammonium dihydrogen phosphate and 370 g. of diammonium monohydrogen phosphate in sufficient water to yield 1000 mls. of solution. The phosphate solution contained 20.4% of equivalent $P_2O_5$ by weight. This ratio of ammonium phosphate salts gave a pH suitable for causing the gelling of the colloidal silica within an hour or so.

When the binder was mixed with the alumina powder, a very heavy paste was first obtained, but with continued stirring it was converted to an extremely dilatant but workable mixture. This mixture was deaerated under vacuum and then cast into a mold.

Drying and firing was carried out as in Example 30. After having been fired for one hour at 1000° C., the sample was heated for one hour at 1200° C. It was then permitted to cool slowly in the furnace, and at room temperature was found to have a modulus of rupture of 2540 p.s.i. The calculated composition of this ceramic body was 91% by weight of $Al_2O_3$, 8.2% by weight of colloidal silica and 0.8% of $P_2O_5$. The ratio of $SiO_2$ to $P_2O_5$ was approximately 10.1.

*Example 35*

The following is an example of a fibrous silicate mineral bonded with a binder composition of this invention.

The binder composition was made by mixing 39 parts by weight of a solution of colloidal silica, containing 58% by weight of $SiO_2$ in the form of colloidal silica particles having an average particle diameter of 100 millimicrons, with 2 parts by weight of 85% phosphoric acid, and diluting with 6.2 parts by weight of water. The diluted and acidified sol was then added, with vigorous stirring, to 40.8 parts by weight of a 67% by weight solution of "Victamide," the latter solution containing about 50% by weight of $P_2O_5$ before mixing with the silica.

The viscous binder mixture was stirred vigorously with an equal weight of a finely divided fibrous talc known as "Loomkill," obtained from the International Talc Company. As soon as the mixture was stirred together, it immediately began to foam up and was poured promptly into a mold where it continued to foam up, much like bread dough. This foaming is believed to be due to the acidic binder reacting with a small amount of magnesium or calcium carbonate which occurs naturally in the talc.

The samples were permitted to dry for several days in the mold, then were baked for three hours at 100° C., and then for three further hours at 300° C., and finally fired, after removal from the mold, to 1000° C. There was obtained a finely foamed, very porous, light-weight ceramic body which did not soften at 1200° C., and which appeared to have good insulating properties, since a blow torch applied to one side of a piece one inch thick, heating to white heat, did not heat the other side to more than a faint redness.

In other tests it was found that the addition of about 4% by weight of magnesium carbonate, based on the fibrous talc, increased the degree of foaming, so that it was possible to produce a final fired product having a bulk density of 15 pounds per cubic foot. However, this material was not as strong as the other products. A preferred product was obtained using less foaming agent, so that the bulk density was 25 pounds per cubic foot after being fired.

*Example 36*

The following is an example of a ceramic body employing a binder of this invention, along with a crystalline silica as the ceramic powder.

Forty parts by weight of a binder solution containing 24.3% by weight of $P_2O_5$ in the form of "Victamide" and 43.8% colloidal silica in the form of 100 millimicron particles, was mixed with 96 parts by weight of silica flour made by grinding silica sand to pass a screen of 325 meshes per inch. The viscous mixture obtained was cast into a mold, air-dried for two days, baked at 600° F. for one hour, then at 800° F. for one hour, then at 1800° F. for one hour and finally was removed from the furnace.

A strong, hard ceramic body was produced. It had a somewhat porous, foam-like structure. An analogous sample made with a 56.1% colloidal silica solution containing 100 millimicron particles, but containing no $P_2O_5$ gave a ceramic body which was quite soft and weak as compared with the body containing $P_2O_5$, when dried and fired under identical conditions.

*Example 37*

The following is an example of silicon nitride powder bonded by a binder solution of this invention.

Twenty parts by weight of a binder solution containing 45.6% of colloidal silica in the form of 100 millimicron particles, and 22.2% by weight of $P_2O_5$ in the form of "Victamide" was mixed with 40 parts by weight of silicon nitride powder, $Si_3N_4$, passing a screen of 100 meshes per inch.

This mixture, which was viscous when poured into the mold, slowly foamed, and after a short period hardened in the mold. The hardened foam dried for two days, baked at 300° C., and finally fired at 1800° F. for half an hour.

The resulting ceramic, which was gray in color, had a finely foamed structure and was very resistant to an oxygen gas flame. It was unchanged by continued heating at 1800° F. It had a density of 1.9 grams per cubic centimeter.

Example 38

This is an example of the use of a binder of this invention in a mixture of ceramic powders.

Twenty-five parts by weight of a binder solution containing 22% by weight of colloidal silica in the form of 15 millimicron particles and 20 parts by weight of $P_2O_5$ in the form of "Victamide," were mixed with 40 parts by weight of "Northite" 100 mesh amorphous silica powder, and 5 parts by weight of silicon nitride 100 mesh powder.

This viscous mixture was poured into a mold, permitted to air dry for two days, during which period it developed a finely foamed structure, then baked at 300° C., and finally fired for one hour at 1800° F. A grayish, finely foamed, hard ceramic body was obtained, which exhibited excellent resistance to the flame of an oxygen gas torch.

Example 39

This is an example of boron carbide powder bonded with a binder solution of this invention. A 21.2 parts-by-weight portion of a binder solution containing 42.4% by weight of 100 millimicron silica particles and 22.2% by weight of $P_2O_5$ in the form of "Victamide," was mixed with 25.7 parts by weight of 100 mesh boron carbide powder. This mixture was cast into a mold, air dried for two days, then baked for three hours at 570° F., and finally was heated during a period of four hours to 1800° F. At 1650° F., the material was a soft mass which could be worked like a viscous, hot glass. When cooled it formed a black, glassy-looking body which had low electrical resistance and conducted electricity to such an extent that when a rod ⅛ inch in diameter and 2 inches long was connected to 110 volts alternating current, it was heated to bright red heat.

Example 40

This is an example of an aqueous colloidal silica binder comprising colloidal silica and phosphoric acid, said acid containing dissolved alumina.

As a starting material, a solution of alumina and phosphoric acid sold by Monsanto Chemical Company under the trade name "Alkophos C" was employed. This was obtained as an aqueous solution containing 8.6% by weight of $Al_2O_3$ and 33% by weight of $H_3PO_4$. However, since the alumina is reacted with the phosphoric acid to form aluminum phosphate, this composition may be expressed as 20.6% by weight of $AlPO_4$ and 12.0% by weight of $P_2O_5$.

For the preparation of the binder, 100 parts by weight of a silica sol containing 30% by weight of silica in the form of particles having an average diameter of 30 millimicrons, and stabilized with sufficient ammonia to give the sol a pH of 9, was first acidified by the addition of 2.3 parts by weight of 85% phosphoric acid. This acidified sol was then added to 100 parts by weight of the aqueous solution "Alkophos C" with good agitation. The mixture was then concentrated by boiling off water under vacuum until 100 parts by weight of water had been removed, leaving a clear, viscous syrup. During this evaporation, the mixture became very thick and somewhat white and opaque, but as evaporation continued, it became less viscous and almost transparent. It had a tacky, adhesive consistency.

Example 41

To make another aqueous binder, 334 parts by weight of a colloidal solution of silica in the form of discrete particles averaging 15 millimicrons in diameter, and containing 30% by weight of $SiO_2$, stabilized at a pH of 9.5 with ammonia, was acidified with 18 parts by weight of 85% phosphoric acid, giving a mixture having a pH of 1.4. To the acidified sol, 138 parts by weight of "Alkophos C" was added with fast mechanical agitation. The pH of the mixture was still 1.4. It was a translucent fluid, free from precipitate. This binder was not as stable as that of Example 40; after three days it had thickened to a gelatinous consistency, which, however, became quite fluid when vigorously stirred. It was suitable for use as a ceramic binder, providing it was employed for this purpose in the fluid, rather than the gel state.

Example 42

This example describes a ceramic body consisting of amorphous silica powder bonded with the binder fluid of Example 41.

Sixty parts by weight of amorphous silica glass pulverized to pass a screen of 100 meshes per inch, was mixed with 32 parts by weight of the binder composition of Example 41, after the latter had been vigorously stirred to fluidize it. There was obtained a thick, very dilatant mass which was deaerated under vacuum, vibrated into a mold, permitted to air dry, then dried for one hour in an air oven at 125° C., then heated to 1000° C. and held at this temperature for one hour, after which the product was removed from the furnace. There was obtained a ceramic body having a fine foam structure, the body having a modulus of rupture at 1620 p.s.i. For comparison, 60 parts by weight of the 100 mesh amorphous silica powder were mixed with 30 parts by weight of the 30% ammonia-stabilized silica sol originally employed for making the binder of Example 41, and this was similarly molded, dried and fired. The ceramic body was very weak due to the fact that much of the colloidal silica had migrated to the surface of the body in the mold as it dried, thus leaving the bottom portion of the specimen exceedingly crumbly and weak. The specimen was so inhomogeneous and weak that it could not be cut to shape for testing.

Example 43

This example describes an aluminum oxide powder bonded with the binder fluid of Example 41.

Sixty parts by weight of 325 mesh aluminum oxide, sold under the trade name "Alcoa A-14" by the Aluminum Company of America, was mixed with 18 parts by weight of the binder composition of Example 41 after the binder had been vigorously stirred to render it fluid. The material was cast, dried and fired under the same conditions employed for Example 42. The specimen had a modulus of rupture of 2830 p.s.i. It will be noted that this bonded alumina body was stronger after being fired at only 1000° C., than was the similar ceramic body of Example 34, which had been fired at 1200° C., a considerably higher temperature. Since the ceramic body of Example 34 was made from a binder containing only silica and $P_2O_5$ as the ceramic binder ingredients, it is seen that in the case of aluminum oxide powders, somewhat stronger bodies are obtained when alumina is included in solution in phosphoric acid in the aqueous binder.

This application is a continuation in part of my now abandoned prior application Serial No. 775,266 filed November 20, 1958, as a continuation in part of my then copending application Serial No. 716,093 filed February 28, 1958, and now abandoned.

I claim:
1. An aqueous binder composition comprising (1) colloidal silica, (2) a water-soluble phosphorus compound selected from the group consisting of monomeric and polymeric phosphoric, phosphorous, and phosphamic acids, their esters, and their volatile base salts, said colloidal silica and said phosphorous compound calculated as $P_2O_5$ being present in a ratio by weight within the range from 1:10 to 50:1, and (3) water, the total concentration of said colloidal silica and said phosphorus compound in said aqueous composition being in the range from 15% to 80% by weight, and the said $P_2O_5$-containing component being the only water-soluble, P$_2$O$_5$-containing component in the composition.

2. A composition as set forth in claim 1 wherein said silica:P$_2$O$_5$ weight ratio is from 1:1 to 10:1.

3. A composition as set forth in claim 1 wherein said silica:P$_2$O$_5$ weight ratio is from 2:3 to 3:1.

4. A composition as set forth in claim 1 wherein said silica:P$_2$O$_5$ ratio is about 2:1.

5. An aqueous mortar-like composition comprising (1) colloidal silica, (2) a water-soluble phosphorus compound selected from the group consisting of monomeric and polymeric phosphoric, phosphorous, and phosphamic acids, their esters, and their volatile base salts, said compound being the only water-soluble, P$_2$O$_5$-containing component present, and (3) larger-than-colloidal partiles of a water-insoluble refractory oxide having a free energy of formation at 1000° C. of more than 60 kilocalories per gram atom of oxygen in the oxide, the weight ratio of said colloidal silica plus said refractory oxide to P$_2$O$_5$ being within the range from 75:25 to 99:1.

6. An aqueous binder composition comprising (1) colloidal silica, (2) phosphoric acid, (3) water, and (4) a water-insoluble, polyvalent-metal phosphate in solution in said phosphoric acid, said colloidal silica and phosphoric acid calculated as P$_2$O$_5$ being present in a ratio by weight within the range from 1:10 to 50:1, and said phosphoric acid being the only water-soluble P$_2$O$_5$-containing component in the composition.

7. A dense ceramic body comprising larger-than-colloidal particles of a refractory material bonded together with a vitreous, fired SiO$_2$—P$_2$O$_5$ composition in which the SiO$_2$:P$_2$O$_5$ weight ratio is at least 1:10, and said vitreous, fired composition is the only P$_2$O$_5$-containing component in the ceramic body.

8. In a process for coating a metal the steps comprising applying to the metal a film of an aqueous composition comprising (1) colloidal silica, (2) a water-soluble phosphorus compound selected from the group consisting of monomeric and polymeric phosphoric, phosphorus, and phosphamic acids, their esters, and their volatile base salts, said colloidal silica and said phosphorus compound calculated as P$_2$O$_5$ being present in a ratio by weight within the range from 1:10 to 50:1, and (3) water, drying the film, heating the dried film to a temperature above about 370° C. until a glass-like coating is formed therefrom, and cooling the metal and coating.

9. An article comprising a metal substrate having a coating on its surface comprising a vitreous, fired SiO$_2$—P$_2$O$_5$ composition in which the SiO$_2$:P$_2$O$_5$ weight ratio is at least 1:10.

10. An aqueous binder composition comprising (1) colloidal silica, (2) a phosphorus compound which is a neutral product of the reaction of P$_2$O$_5$ and anhydrous ammonia at 150° C. having N/P atomic ratio less than 1.5/1 and containing no water of constitution, said colloidal silica and said phosphorus compound calculated as P$_2$O$_5$ being present in a ratio by weight within the range from 1:10 to 50:1, and (3) water, the total concentration of said colloidal silica and said phosphorus compound being in the range from 15% to 80% by weight, and said P$_2$O$_5$-ammonia reaction product being the only water-soluble P$_2$O$_5$-containing component in the composition.

11. An aqueous binder composition comprising (1) colloidal silica, (2) ammonium phosphate, said colloidal silica and ammonium phosphate calculated as P$_2$O$_5$ being present in a ratio by weight within the range from 1:10 to 50:1, and (3) water, the total concentration of said colloidal silica and said ammonium phosphate being in the range from 15% to 80% by weight, and said silica- and P$_2$O$_5$-containing components being the only nonvolatile components in the composition.

12. In a process for forming a porous, foam-structured body the step comprising heating at a temperature of from 100 to 400° C. a binder composition comprising (1) colloidal silica (2) a water-soluble phosphorus compound selected from the group consisting of monomeric and polymeric phosphoric, phosphorous, and phosphamic acids, their esters, and their volatile base salts, said colloidal silica and said phosphorus compound calculated as P$_2$O$_5$ being present in a ratio by weight within the range from 1:10 to 50:1, and (3) water, the total concentration of said colloidal silica and said phosphorus compound in said aqueous composition being in the range from 15% to 80% by weight, and the said P$_2$O$_5$-containing component being the only water-soluble, P$_2$O$_5$-containing component in the binder composition.

13. In a process for forming a vitreous, water-resistant, thermally shock-resistant, ceramic article the step comprising heating at a temperature above about 1000° C. a binder composition consisting essentially of (1) colloidal silica and (2) phosphoric acid anhydride (P$_2$O$_5$), said colloidal silica and P$_2$O$_5$ being present in a ratio by weight within the range from 1:10 to 50:1.

References Cited in the file of this patent

UNITED STATES PATENTS

| | | |
|---|---|---|
| 1,900,864 | Lowe et al. | Mar. 7, 1933 |
| 2,479,504 | Moore et al. | Aug. 16, 1949 |
| 2,507,131 | Winston et al. | May 9, 1950 |
| 2,521,839 | Feagin | Sept. 12, 1950 |
| 2,588,646 | Miller | Mar. 11, 1952 |
| 2,592,521 | Thompson | Apr. 8, 1952 |
| 2,680,890 | Moore et al. | June 15, 1954 |
| 2,681,860 | Rhodes et al. | June 22, 1954 |
| 2,687,967 | Yedlick et al. | Aug. 31, 1954 |
| 2,701,218 | Nickerson | Feb. 1, 1955 |
| 2,787,968 | Luvisi | Apr. 9, 1957 |
| 2,802,749 | West et al. | Aug. 13, 1957 |
| 2,802,750 | Veale et al. | Aug. 13, 1957 |
| 2,809,907 | Cramer | Oct. 15, 1957 |
| 2,811,457 | Spell et al. | Oct. 29, 1957 |
| 2,852,401 | Hansen et al. | Sept. 16, 1958 |
| 2,881,081 | Henricks | Apr. 7, 1959 |

FOREIGN PATENTS

| | | |
|---|---|---|
| 560,095 | Germany | Apr. 7, 1933 |